United States Patent
Elsberg et al.

(10) Patent No.: US 8,427,473 B2
(45) Date of Patent: Apr. 23, 2013

(54) PSEUDO-REALISTIC RENDERING OF BIM DATA RESPONSIVE TO POSITIONAL INDICATOR

(75) Inventors: Nathan Elsberg, Modiin (IL); Alex Hazanov, Katzir (IL); Arkady Ratnitsky, Hadera (IL)

(73) Assignee: RDV Systems Ltd., Rosh Ha'ayin (IL)

( * ) Notice: Subject to any disclaimer, the term of this patent is extended or adjusted under 35 U.S.C. 154(b) by 893 days.

(21) Appl. No.: 12/558,509

(22) Filed: Sep. 12, 2009

(65) Prior Publication Data
US 2010/0110071 A1    May 6, 2010

Related U.S. Application Data

(60) Provisional application No. 61/100,734, filed on Sep. 28, 2008.

(51) Int. Cl.
*G06T 17/00* (2006.01)
(52) U.S. Cl.
USPC .................................. 345/420; 345/419
(58) Field of Classification Search .......... 345/420, 345/419
See application file for complete search history.

(56) References Cited

U.S. PATENT DOCUMENTS

| | | | |
|---|---|---|---|
| 5,832,106 A | 11/1998 | Kim | |
| 5,905,657 A | 5/1999 | Celniker | |
| 6,084,979 A | 7/2000 | Kanade et al. | |
| 6,128,577 A | 10/2000 | Assa et al. | |
| 6,313,837 B1 | 11/2001 | Assa et al. | |
| 6,421,116 B1 | 7/2002 | Schilli et al. | |
| 6,437,823 B1 | 8/2002 | Zhang | |
| 6,692,357 B2 | 2/2004 | Koizumi et al. | |
| 6,700,573 B2 | 3/2004 | Freeman | |
| 6,816,187 B1 | 11/2004 | Iwai et al. | |
| 6,910,001 B2 | 6/2005 | Hammersley et al. | |
| 6,930,715 B1 | 8/2005 | Mower | |
| 7,978,192 B2 | 7/2011 | Elsberg | |
| 8,031,210 B2 | 10/2011 | Elsberg | |
| 2002/0093538 A1 | 7/2002 | Carlin | |
| 2002/0144278 A1 | 10/2002 | Pratts et al. | |
| 2003/0012409 A1 | 1/2003 | Overton et al. | |
| 2003/0103049 A1 | 6/2003 | Kindratenko et al. | |
| 2004/0105573 A1 | 6/2004 | Neumann et al. | |
| 2005/0091016 A1 | 4/2005 | Godavarthy et al. | |
| 2007/0016372 A1 | 1/2007 | Browne et al. | |

(Continued)

OTHER PUBLICATIONS

Behzadan et al. "Georeferenced Registration of Construction Graphics in Mobile Outdoor Augmented Reality", Journal of Computing in Civil Engineering © ASCE / Jul./Aug. 2007; pp. 247-250.*

(Continued)

*Primary Examiner* — Maurice L McDowell, Jr.
(74) *Attorney, Agent, or Firm* — Simon Kahn; Chanoch Kahn (57) ABSTRACT

An electronically implemented method of on-site visualization of building information model data, the method constituted of: loading a 3D scene comprising building information model data; receiving real time positional information comprising geographic coordinate information and orientation information; rendering a pseudo-realistic image of the loaded 3D scene responsive to the real time positional information; and displaying the rendered pseudo-realistic image. Preferably the method further provides for displaying engineering information of the building information model responsive to the real time positional information. Preferably, the pseudo-realistic image provides shadowing responsive to real time chronographic information and the received real time positional information.

8 Claims, 4 Drawing Sheets

U.S. PATENT DOCUMENTS

| | | | |
|---|---|---|---|
| 2007/0078636 A1 | 4/2007 | Elsberg et al. | |
| 2008/0012863 A1 | 1/2008 | Finn et al. | |
| 2008/0027684 A1 | 1/2008 | Inzinga et al. | |
| 2008/0062167 A1* | 3/2008 | Boggs et al. | 345/419 |
| 2008/0229234 A1 | 9/2008 | Astolfi et al. | |
| 2008/0297505 A1 | 12/2008 | Elsberg | |
| 2009/0128554 A1 | 5/2009 | Elsberg | |

OTHER PUBLICATIONS

Thomas et al. "Using Augmented Reality to Visualise Architecture Designs in an Outdoor Environment", in DCNET1999—Design Computing on the Net Nov. 1999—Sydney, NSW, Australia—Copyright (C) 1999; pp. 5, 7.*

Moloney, "Augmented Reality Visualisation of the Built Environment to Support Design Decision Making" Proceedings of the Information Visualization (IV'06) 2006 IEEE; pp. 3, 5.*

Kahkonen et al. "Integrating Building Product Models With Live Video Stream", 7th International Conference on Construction Applications of Virtual Reality: Oct. 22-23, 2007; p. 180.*

PD5D Smart Pack Manual (Published on the Internet Sep. 2003).

* cited by examiner

PSEUDO-REALISTIC RENDERING OF BIM DATA RESPONSIVE TO POSITIONAL INDICATOR

CROSS-REFERENCE TO RELATED APPLICATION

This application claims priority from U.S. Provisional Patent Application 61/100,734 filed Sep. 28, 2008, entitled "Pseudo-Realistic Rendering of BIM Data Responsive to Positional Indicator", the entire contents of which is incorporated herein by reference.

BACKGROUND

The invention relates generally to the field of building information modeling, and in particular to a method and apparatus providing pseudo-realistic rendering of a building information model responsive to a device providing real time positional information.

Building information modeling is the process of generating and managing building data during its life cycle. Typically it uses three-dimensional, dynamic building modeling software to increase productivity in building design and construction. The term building design and construction is not limited to physical dwellings and/or offices, but is meant to additionally include any construction project including, without limitation, road and infrastructure projects. The process produces a Building Information Model (BIM), which as used herein comprises building geometry, spatial relationships, geographic information, and quantities and properties of building components, irrespective of whether we are dealing with a physical building or a general construction project including land development and infrastructure.

The use of interactive and dynamic 3D computer graphics is becoming prevalent in the computing world. Typically, 3D visualization applications provide photo-realistic results using techniques such as ray tracing, radiosity, global illumination and other shading, shadowing and light reflection techniques. Such 3D visualization applications provide a 3D generated model, without relationship to the existing environment.

U.S. patent application Ser. No. 11/538,103 to Elsberg et al, entitled "Method and Apparatus for Virtual Reality Presentation of Civil Engineering, Land Planning and Infrastructure", published as US 2007/0078636 A1, the entire contents of which is incorporated herein by reference, is addressed to a computer implemented method of visualizing an infrastructure, in which the rendering is accomplished in cooperation with a material definition. Such a method allows for evaluating large scale designs in a virtual reality environment, in which the virtual reality rendering exhibits a pseudo-realistic image, i.e. an image which comprises at least one of shading, texturing, illumination and shadowing based on real world parameters.

Rapid Design Visualization is a software application available from RDV Systems, Ltd. of Lod, ISRAEL, which enables any Civil 3D user to create a fully interactive visualization environment directly from their Civil 3D project. Civil 3D is a software BIM solution for the field of civil engineering available from Autodesk, Inc. of San Rafael, Calif. The Rapid Design Visualization software enables a Civil 3D designer to easily create drive through simulations, flyovers and interactive simulations for proposed roads, subdivisions, underground infrastructure, interchanges and many other complex land development projects. Such an interactive simulation enables a potential user, developer, or investor, to visualize a Civil 3D project in an office environment.

Unfortunately, there is no ready means to enable a user to utilize the resultant visualizations in relation to a physical site inspection. As a result, the target audience for the visualizations produced is somewhat limited, and many visualization observers are left unsure of the believability and accuracy of the visualizations.

SUMMARY

Accordingly, it is a principal object of the present invention to overcome at least some of the disadvantages of prior art visualization techniques. This is accomplished in certain embodiments by providing a real time updatable pseudo-realistic rendering of BIM data and engineering information responsive to a positional indicator, the positional indicator providing geographic coordinates and orientation information. The pseudo-realistic rendering of BIM data exhibits at least one of texturing, shading and time dependent shadowing, and preferably exhibits texturing, shading and time dependent shadowing.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Certain of the present embodiments enable a real time updatable pseudo-realistic rendering of BIM data and engineering information responsive to a positional indicator, the positional indicator providing geographic coordinates and orientation information. The pseudo-realistic rendering of BIM data exhibits at least one of texturing, shading and time dependent shadowing, and preferably exhibits texturing, shading and time dependent shadowing.

Certain of the embodiments find application in real estate transactions, enabling a potential purchaser of a single dwelling or an estate or subdivision to more clearly visualize the final construction, including the resultant surroundings. Additionally, certain of the embodiments enable improved environmental impact studies by enabling a studier to more clearly visualize a potential construction project in cooperation with a view of the actual land to be affected.

Certain of the embodiments enable an evaluation of planned road signs and traffic signals, wherein a planner may review the sight impact or planned location in cooperation with actual road conditions. Certain of the embodiments enable an evaluation of planned bridge structures, including sight impact, general construction evaluation, verification and guidance during construction phases. Certain of the embodiments enable an evaluation of planned dam construction, including sight impact, general construction evaluation, verification and guidance during construction phases. Certain of the present embodiments enable a review of planned improvements along existing alignments, including without limitation road widening.

Certain of the present embodiments enable a general exterior architectural walk-around in cooperation with a pseudo-realistic image of a planned construction in cooperation with a BIM. Certain of the present embodiments enable field evaluation of completed construction, and comparison with a pseudo-realistic image of the construction in cooperation with the BIM, for either updating the BIM, or evaluating potential construction changes/additions.

Certain of the present embodiments enable field evaluation of planned construction via use of the pseudo-realistic image of the planned construction, in accordance with the BIM, in cooperation with a view of the actual land or site being developed.

Certain of the present embodiments enable production of composite imagery, as photographs of the current site are associated with real time positional information, and the same real time positional information is further associated with the pseudo-realistic image rendered from the BIM data.

Certain of the embodiments enable simulating reduced visibility such as fog or night time driving conditions for a planned road surface, or road surrounding, by adjusting the pseudo-realistic image to reflect the reduced visibility conditions.

Certain of the present embodiments enable evaluating acoustic walls and barriers, whose effectiveness is correlated with line of sight information. Thus, the use of a pseudo-realistic image correlated with real time positional information enables actual field confirmation of the effectiveness of proposed acoustic walls and barriers.

Certain of the present embodiments enable multiple simultaneous 3D perspective view ports.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
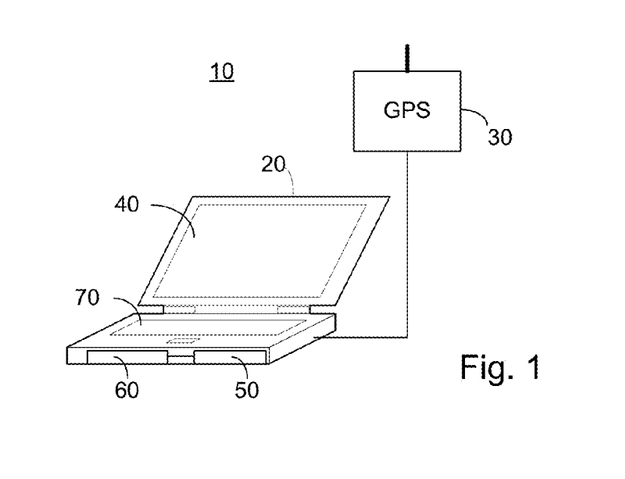
FIG. 1 illustrates a high level block diagram of an electronic device comprising a mobile computing platform in accordance with an exemplary embodiment.

FIG. 1 illustrates a high level block diagram of an electronic device 10 comprising a mobile computing platform 20 and a real time position determining device 30 in accordance with an exemplary embodiment. Mobile computing platform 20 comprises a display 40, a processor 50; a memory 60; and a user input device 70. Real time position determining device 30 is in communication with mobile computing platform 20, and in particular with processor 50. Processor 50 is further in communication with display 40, memory 60 and user input device 70. In one non-limiting embodiment, real time position determining device 30 is constituted of a global positioning system (GPS) receiver.

In operation, real time position determining device 30 is operative to continuously output real time geographic coordinate information and orientation information. Processor 50 is operative responsive to computer readable instructions stored on memory 60 to load a 3D scene comprising Building Information Model (BIM) data, preferably stored on memory 60. Processor 50 is further operative to render a pseudo-realistic image of the loaded 3D scene, responsive to the real time geographic coordinate information and orientation information of real time position determining device 30, and output the rendered pseudo-realistic image on display 40. Processor 50 is yet further operative to output engineering information of the BIM on display 40, the engineering information being similarly responsive to the real time geographic coordinate information and orientation information of real time position determining device 30.

As described above, the term BIM, as used throughout this document comprises building geometry, spatial relationships, geographic information, and quantities and properties of building components, irrespective of whether we are dealing with a physical building or a general construction project including land development and infrastructure. As described above, the term pseudo-realistic image as used in this document means an image which comprises at least one of shading, texturing, illumination and shadowing based on real world parameters, and preferably comprises at least two of shading, texturing, illumination and shadowing.

In one embodiment the 3D scene is rendered in accordance with the teachings of U.S. patent application Ser. No. 11/538, 103 to Elsberg et al, entitled "Method and Apparatus for Virtual Reality Presentation of Civil Engineering, Land Planning and Infrastructure", published as US 2007/0078636 A1, incorporated above by reference. In another embodiment the 3D scene is developed via photogrammetry, from existing architectural plans and land survey information, via light detecting and ranging (LIDAR) and/or from existing or developed geographic information system (GIS) data.

In one embodiment the 3D scene comprises at least one dynamic object, whose motion may optionally be set to be fixed. Thus, in a non-limiting example, a vehicle having a predetermined speed of travel may be displayed in the pseudo-realistic scene. In the event that the user's actual travel, in the real world, matches the predetermined speed the user will be seen to be maintaining pace in relation to the dynamic object vehicle.

In certain embodiments, responsive to a user input via user input device 70, the transparency of at least one element of the 3D scene may be adjusted, or at least one element of the 3D scene may be turned off. In an exemplary embodiment, turning of at least one element comprises adjusting the transparency of the at least one element to 100%. Adjusting the transparency, or turning off of at least one element, provides the user with extraordinary visual perception. Alternatively, sight conditions of the display 3D scene may be adjusted so as to provide a simulation of reduced visibility conditions such as fog.

In one particular embodiment, real position determining device 30 is further operative to output chronographic information. In another embodiment, processor 50 is operative to obtain chronographic information from an on-board timer. Preferably, the pseudo-realistic image is rendered further responsive to the chronographic information. Thus, in one embodiment, the pseudo-realistic image output on display 40 exhibits shadowing responsive to a calculated position of the sun; correct for the latitude, longitude, elevation and local time received from real time position determining device 30.

In particular, camera coordinates and direction for the rendered pseudo-realistic image and engineering information are determined based on the real time geographic coordinate information and orientation information of real time position determining device 30. In one optional embodiment, the real time geographic coordinate information and orientation information provided by real time position determining device 30 is in respect to three orthogonal axes. In another optional embodiment, the real time geographic coordinate information and orientation information provided by real time position determining device 30 is in respect to latitude, longitude and elevation.

Optionally, an offset may be applied to the real time geographic coordinate information and orientation information of real time position determining device 30 to define the camera coordinates and/or direction. In one embodiment the offset is provided manually, via user input device 70, to compensate for inaccuracies of real time position determining device 30, or to provide for a different view, such as a birds eye view, a view over an existing structure, or a different directional view. In one non-limiting example, it is known that the effectiveness of acoustic walls and barriers are related to their ability to block a line of sight, and thus adjusting the camera direction to confirm that the line of sight of a planned acoustic wall or barrier to a target is indeed blocked over a range of field confirmed positions is enabled.

In another embodiment, the offset is provided manually, via user input device 70, as an indication that a particular point on the rendered pseudo-realistic image output on display 40 matches the current location of the user. Such a comparison allows for a direct input adjusting for any inaccuracies in the real time geographic coordinate information and orientation information of real time position determining device.

In yet another embodiment, the offset is provided responsive to the BIM. Thus, in one non-limiting example, in which the BIM comprises a new road surface exhibiting a different elevation than a current road surface, the elevation information received from real time position determining device 30 is replaced with elevation information from the BIM. In another non-limiting example, in which the BIM comprises a circular or spiral staircase, as the user proceeds along the path of the staircase the elevation of the pseudo-realistic image output on display 40 is adjusted responsive to the elevation of the staircase structure of the BIM. In one non-limiting example, this is accomplished in accordance with the teachings of interactive walk through technology, known to those skilled in the art.

Preferably, the pseudo-realistic image output on display 40 is provided with an adjustable field of view responsive to a user input via user input device 70. The use of an adjustable field of view enables a user to receive a pseudo-realistic image on display 40 matching the view seen by the user. In one non-limiting example, the field of view is set to match the view seen from a user's automotive windshield. In another non-limiting example, the field of view is set to match the field of view of a camera, or video camera, thus enabling a match up of images and video. The use of a camera enables real site comparison, and the creation of a composite image, as further described in co-pending patent application Ser. No. 11/865,003 filed Sep. 30, 2007, entitled "Method and Apparatus for Creating a Composite Image", the entire contents of which is incorporated herein by reference. The use of a video camera enables recording of a drive through or walk through, and a comparison with a recording of the continuously rendered pseudo-realistic image responsive to the real time geographic coordinate information and orientation information of real time position determining device 30.

Optionally, the engineering information displayed is responsive to real time position determining device 30, with any of the optional offsets described above. In one embodiment, the engineering information comprises at least one of: elevation; slope; cut and fill value; and visibility information. Optionally, the visibility information is in accordance with teachings of U.S. patent application Ser. No. 11/865,002 filed Sep. 30, 2007 entitled "Method and Apparatus for Evaluating Sight Distance", the entire contents of which is incorporated herein by reference. Preferably, the display of such information enables a user to compare planned construction elements with actual land features and identify issues, such as incompatibilities, prior to, or during construction, by a detailed field comparison of a pseudo-realistic visualization of BIM data against real world features.

Optionally, a user input received via user input device 70 associated with a particular position and orientation, as defined by real time position determining device 30, with any of the optional offsets described above, may be stored on memory 60 associated with the position of the BIM via processor 50. The user input may comprise a photograph, note or sketch. Processor 50 is further operative to add an icon representation of the user input to the displayed pseudo-realistic image, and when the position of the user again approximately matches the saved particular position and orientation, processor 50 is further operative to output the user input on display 40. Preferably, positional indicators are displayed along with the icon representation to enable the user to achieve a match of the user position and orientation and the saved particular position and orientation.

Figure 2:
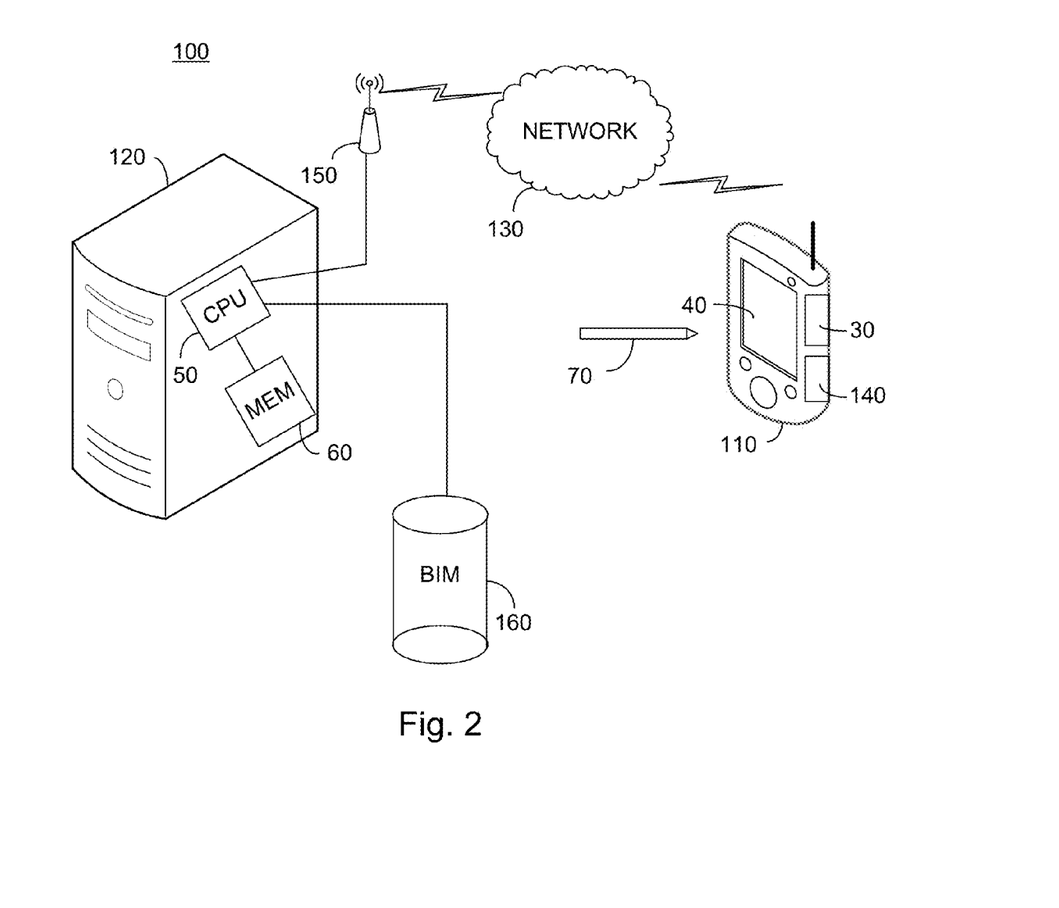
FIG. 2 illustrates a high level block diagram of an electronic device comprising a mobile display device in communication with a computing platform in accordance with an exemplary embodiment.

FIG. 2 illustrates a high level block diagram of an electronic device 100 comprising a mobile display device 110 in communication with a computing platform 120 via a network 130, in accordance with an exemplary embodiment. Mobile display device 110 comprises: a real time position determining device 30: a communication module 140; a display 40; and a user input device 70. Computing platform 120 comprises: a processor 50; a memory 60; a communication module 150; and a BIM storage 160. In one embodiment, network 130 is a General Packet Radio Service (GPRS), however this is not meant to be limiting in any way.

Real time position determining device 30 is in communication with computing platform 120 via communication module 140 through network 130 and communication module 150. The action of user input device 70 is further communicated to computing platform 120, and particularly processor 50, via an on-board processor (not shown) of mobile display device 110. In one non-limiting example, mobile display device 110 is a personal digital assistant, or a hand held computer. Processor 50 is in communication with memory 60 and BIM storage 160.

In operation, electronic device 100 is in all respects similar to electronic device 10 of FIG. 1, with the operation of processor 50 being physically removed from real time positioning device 30 and display 40. Computing platform 120 may be implemented as a server, in place of the dedicated mobile computing platform 20 of FIG. 1. Thus, the position of real time positioning device 30 and optionally any chronographic information, is transferred to processor 50 via network 130, in one embodiment as asynchronous requests, such as by an asynchronous JavaScript and XML request. Processor 50 is operative to render the pseudo-realistic image, as described above, and communicate the pseudo realistic image, engineering information, and stored user inputs, via network 130 for output on display 40.

Figure 3:
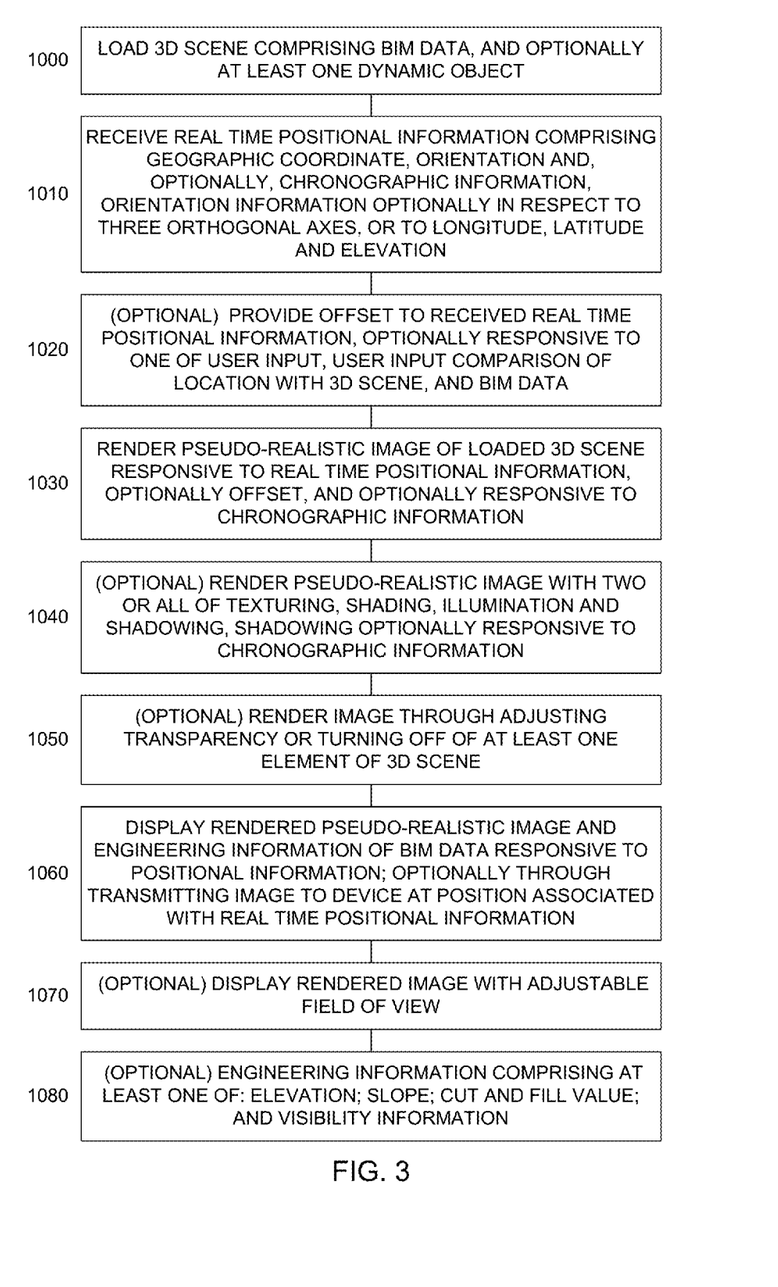
FIG. 3 illustrates a high level flow chart of an embodiment of a method of field presentation of BIM data in accordance with certain embodiments.

FIG. 3 illustrates a high level flow chart of an embodiment of a method of field presentation of BIM data in accordance with certain embodiments. In certain particular embodiments the method is embodied in a computer-readable medium, such as memory 50, containing instructions for controlling an electronic device, such as processor 60, to perform the method. In stage 1000 a 3D scene comprising BIM data, preferably stored on a memory device such as memory 60 of FIG. 1, or BIM storage 160 of FIG. 2, is loaded onto a computing device, such as processor 50 of FIGS. 1, 2. Optionally, the loaded 3D scene also comprises at least one dynamic object. Preferably, the BIM model comprises some or all of: 3D terrain information, aerial photography, materials, textures and 3D objects.

In stage 1010 real time positional information comprising geographic coordinate information, orientation information and, optionally, chronographic information, is received. Preferably, the information is output from a real time position determining device, such as real time position determining device 30 of FIGS. 1, 2 and is received by processor 50. In one embodiment the real time position determining device is constituted of a global positioning system (GPS) receiver. Optionally, orientation information is in respect to three orthogonal axes or in respect to longitude, latitude, and elevation.

The real time position determined by the real time position determining device may not be 100% accurate, as is normal for GPS receivers, and in optional stage 1020 an offset is provided to the received real time positional information of stage 1010 so as to match the positional information with the actual position. In one embodiment the offset is provided by receiving from the user an identification of the user's current location as a particular point on a displayed pseudo-realistic image, as will be described further below. In another embodiment a particular offset is received so as to enable a view different from the current location, such as a view from an adjusted elevation.

Additionally, and optionally, real time tracking of the received real time positional information corrects for inaccuracies by identifying obvious erroneous accelerations or speeds, which are not reflective of reality, and are instead an artifact of the real time positional information. Thus, in one embodiment, in the event that consecutive positional information data indicates a speed in excess of a predetermined limit, the received positional data is adjusted to reflect the calculated location based on the previous calculated speed or acceleration.

Optionally, the offset is provided responsive to the BIM data of the loaded 3D scene of stage 1000. Thus, in non-limiting example, in which the BIM comprises a new road surface exhibiting a different elevation than a current road surface, the elevation information received in stage 1010 is replaced with elevation information from the BIM. In another non-limiting example, if the BIM comprises a circular or spiral staircase, as the user proceeds along the path of the staircase the elevation of the pseudo-realistic image is adjusted responsive to the elevation of the staircase structure of the BIM. In one non-limiting example, this is accomplished in accordance with the teachings of interactive walk through technology, known to those skilled in the art.

Optionally, a particular camera view may be user selected, such as one of first person, over the shoulder, follow a defined target, or birds eye view, without exceeding the scope. Additionally, a plurality of views may be generated without exceeding the scope.

In stage 1030 a pseudo-realistic image of the loaded 3D scene of stage 1000 is rendered, responsive to the received real time positional information of stage 1010, optionally offset as described above in stage 1020. Rendering of the image is optionally also responsive to the optionally received chronographic information of stage 1010. In optional stage 1040 the rendering of the image of stage 1030 comprises at least two, or all of texturing, shading, shadowing and illumination, the shadowing and/or illumination optionally being responsive to the optionally received chronographic information of stage 1010. Thus, in one embodiment, the pseudo-realistic image of stage 1030, in cooperation with stage 1040, exhibits illumination and shadowing responsive to a calculated position of the sun; correct for the latitude, longitude, elevation and local time of the received real time positional information of stage 1010.

In one embodiment the 3D scene is rendered in accordance with the teachings of U.S. patent application Ser. No. 11/538,103 to Elsberg et al, entitled "Method and Apparatus for Virtual Reality Presentation of Civil Engineering, Land Planning and Infrastructure", published as US 2007/0078636 A1, incorporated above by reference. In another embodiment the 3D scene is developed via photogrammetry, from existing architectural plans and land survey information, via light detecting and ranging (LIDAR) and/or from existing or developed geographic information system (GIS) data.

Preferably, the rendered image thus reflects the information of the loaded 3D scene of stage 1000, including materials and textures applied to different objects in the scene. Further preferably, the camera position, illumination and shading reflects the real time positional and chronographic information of stage 1010. In one embodiment the image is rendered by OpenGL or DirectX. In another embodiment the pseudo-realistic image is rendered by an applied ray-tracing algorithm.

In optional stage 1050 the rendering of the image of stage 1030 comprises adjusting the transparency, or turning off of at least one element of the loaded 3D scene of stage 1000. Adjusting the transparency, or turning off of at least one element, provides the user with extraordinary visual perception. Alternatively, sight conditions of the display 3D scene may be adjusted so as to provide a simulation of reduced visibility conditions such as fog.

In stage 1060 the rendered pseudo-realistic image of stages 1030-1050, and the engineering information of the loaded BIM data of stage 1000 are displayed at a user display, such as display 40 of FIGS. 1, 2. The displayed engineering information is preferably responsive to the real time positional information of stage 1010. Optionally, as described in relation to computing device 100 of FIG. 2, the displaying is via transmitting the rendered pseudo-realistic image to a device at the position associated with the received real time positional information of stage 1010. Optionally, the user display is a heads up display, thus enabling view by the user overlaid on the real world view.

In optional stage 1070, the rendered image is displayed with an adjustable field of view. The use of an adjustable field of view enables a user to receive a pseudo-realistic image matching the view seen by the user. In one non-limiting example, the field of view is set to match the view seen from a user's automotive windshield. In another non-limiting example, the field of view is set to match the field of view of a camera, or video camera, thus enabling a match up of images and video. The use of a camera enables real site comparison, and the creation of a composite image, as further described in co-pending patent application Ser. No. 11/865, 003 filed Sep. 30, 2007, entitled "Method and Apparatus for Creating a Composite Image", incorporated above by reference. The use of a video camera, enables recording of a drive through or walk through, and a comparison with a recording of the continuously rendered pseudo-realistic image responsive to the received real time geographic coordinate information and orientation information of stage 1010.

In optional stage 1080, the displayed engineering information comprises at least one of: elevation; slope; cut and fill value; and visibility information. Additionally, information such as expected vehicle behavior or line of sight information is further displayed responsive to the current, optionally adjusted, positional information of stage 1010.

The above has been described in an embodiment in which only a single view is rendered and displayed, however this is not meant to be limiting in any way. A plurality of 3D pseudo-realistic views may be rendered and displayed without exceeding the scope, optionally rendered and displayed simultaneously.

The display of stages 1070, 1080 are updated regularly, either continuously, periodically, or in response to received changes in real time positional information, by repeating stages 1010-1080.

Figure 4:
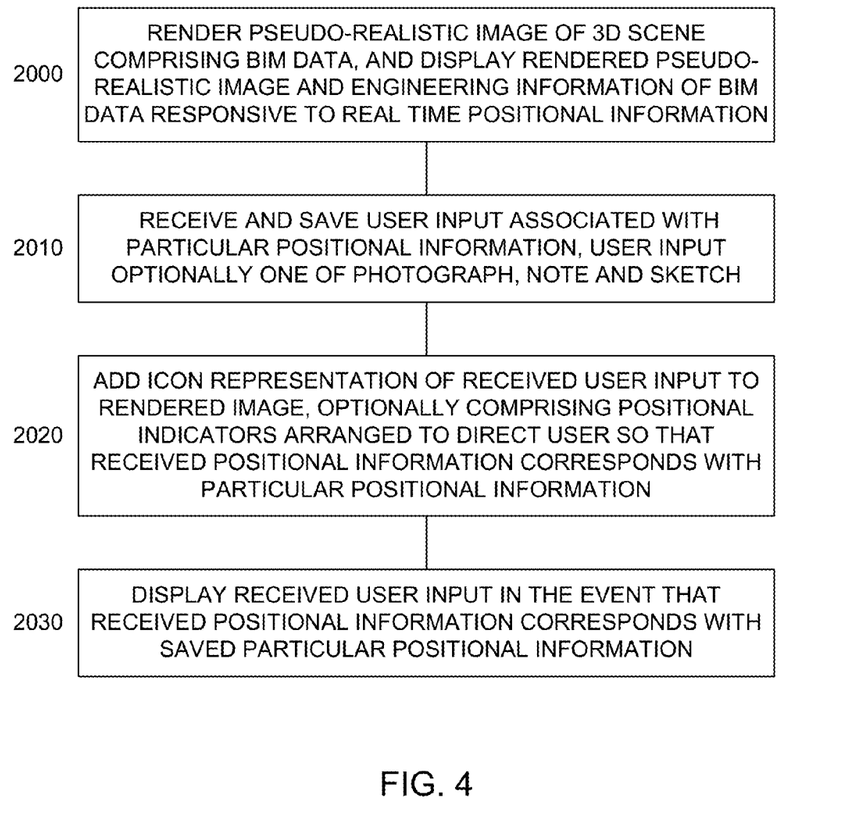
FIG. 4 illustrates a high level flow chart of a method of field presentation of BIM data, in accordance with certain embodiments, further providing for a user input to be stored and displayed associated with a particular positional information.

FIG. 4 illustrates a high level flow chart of a method of field presentation of BIM data, in accordance with certain embodiments, further providing for a user input to be stored and displayed associated with a particular positional information. In certain particular embodiments the method is embodied in a computer-readable medium, such as memory 50, containing instructions for controlling an electronic device, such as processor 60, to perform the method. In stage 2000, a 3D scene comprising BIM data is loaded and a rendered pseudo-realistic image is displayed with engineering information of the BIM data responsive to received real time positional information as described above in relation to the method of FIG. 3.

In stage 2010 a user input associated with particular positional information is inputted at a user input device, such as user input device 70 of FIGS. 1, 2, and is received and saved. Optionally, the user input is received by processor 50 and saved on memory 60 of FIGS. 1, 2. Optionally, the received user input comprises one of a photograph, note and sketch.

In stage 2020 an icon representation of the received user input of stage 2010 is added to the rendered pseudo-realistic image of stage 2000. Optionally, the icon representation comprises positional indicators arranged to direct a user to the correct position and orientation of the saved user input of stage 2010, as will be described further below. In one embodiment, different icons are presented to reflect the nature of the stored user input.

In stage 2030, in the event that the received real time current positional information corresponds with the saved particular positional information of stage 2010, the received user input of stage 2010 is displayed. Thus, since the display of the user information is responsive to the user's current position and orientation, the optional positional indicators of stage 2020 assist the user in viewing the complete stored input information. There is no requirement that current positional information precisely match the saved particular positional information, and the allowed deviation is in one embodiment set globally, and in another embodiment set by the user.

The above has been described in an embodiment in which each user input is stored and displayed responsive to a particular positional indicator including geographic and orientation information, however this is not meant to be limiting in any way. In another embodiment, certain user inputs are stored associated with geographic information and are viewed responsive to matching geographic information, irrespective of orientation.

In one embodiment versioning information is provided associated with the saved user input. Thus, adjustments to the user input may be saved, and a historical record viewed.

Figure 5:
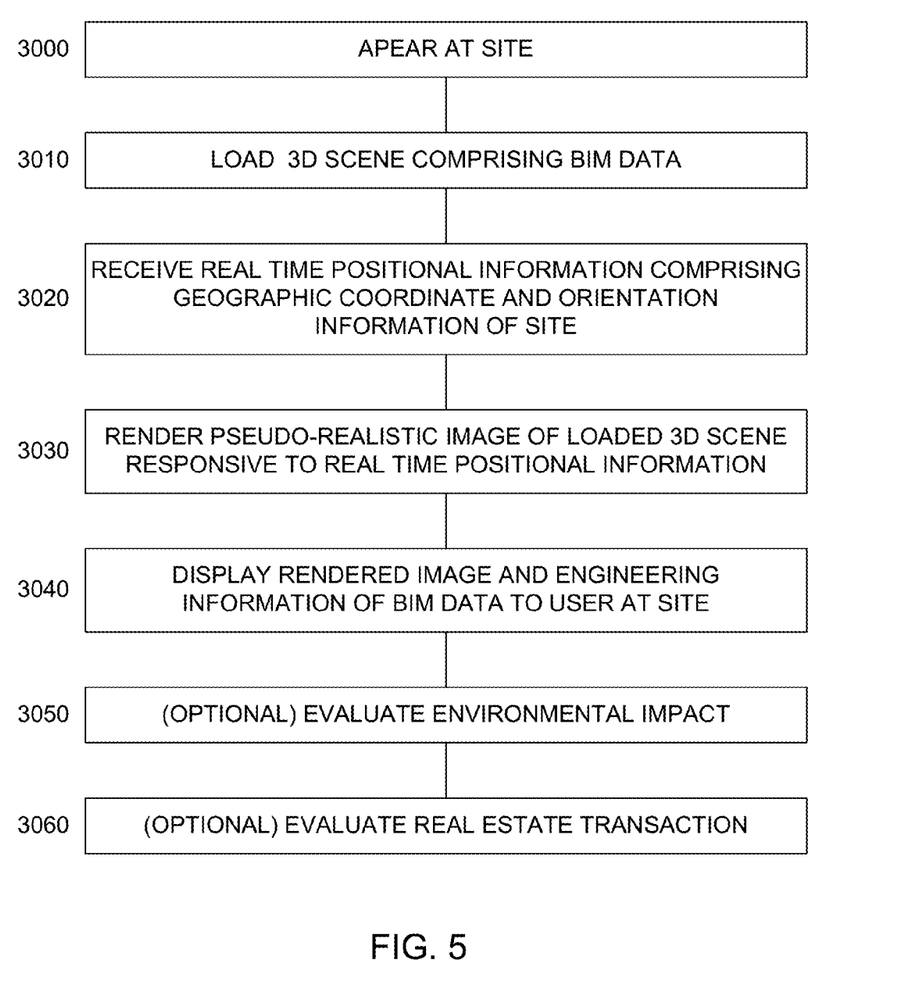
FIG. 5 illustrates a high level flow chart of an embodiment of a method of evaluating a site according to certain embodiments.

FIG. 5 illustrates a high level flow chart of an embodiment of a method of evaluating a site according to certain embodiments. In particular, the method provides for the display of a pseudo-realistic image at a proposed construction site, i.e. in the field, enabling a realistic view of a proposed project in cooperation with a view of the actual field. Such a view comparison enables a potential purchaser to better appreciate the proposed construction, and further enables environmental impact studies. In certain particular embodiments the method is embodied in a computer-readable medium, such as memory 50, containing instructions for controlling an electronic device, such as processor 60, to perform the method.

In stage 3000 a user appears at a site to be evaluated. In stage 3010 a 3D scene comprising BIM data is loaded onto a computing device as described above in relation to stage 1000 of FIG. 3. In stage 3020 real time positional information comprising geographic coordinate information and orientation information of the evaluation site is received at the computing device as described above in relation to stage 1010 of FIG. 3. In stage 3030 a pseudo-realistic image of the loaded 3D scene of stage 3010 is rendered responsive to the received real time positional information of stage 3020 as described above in relation to stages 1030-1040 of FIG. 3.

In stage 3040 the rendered pseudo-realistic image of stage 3030, and the engineering information of the loaded BIM data of stage 3010 are displayed to the user of stage 3000, at a user display, as described above in relation to stages 1060-1080 of FIG. 3. In optional stage 3050 the environmental impact of a proposed construction project on site is evaluated. In optional stage 3060 the value of a real estate transaction is evaluated responsive to possible construction projects on site.

Thus, certain of the present embodiments enable a real time updatable pseudo-realistic rendering of BIM data and engineering information responsive to a positional indicator, the positional indicator providing geographic coordinates and orientation information. The pseudo-realistic rendering of BIM data exhibits at least one of texturing, shading and time dependent shadowing, and preferably exhibits texturing, shading and time dependent shadowing.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A non-transitory computer-readable medium containing instructions for controlling an electronic device to perform a method of on-site visualization of building information model data, the method comprising:
   loading a 3D scene comprising building information model data;
   receiving real time positional information comprising geographic coordinate information and orientation information;
   rendering a pseudo-realistic image of said loaded 3D scene responsive to said real time positional information;
   providing an offset to said received real time positional information, wherein said offset is provided responsive to said building information model data, said rendering responsive to said provided offset and said received real time positional information;
   displaying said rendered pseudo-realistic image; and
   simultaneously displaying engineering information of said building information model data, said displayed engineering information being responsive to said real time positional information.

2. A non-transitory computer-readable medium containing instructions for controlling an electronic device to perform a method of on-site visualization of building information model data, the method comprising:
   loading a 3D scene comprising building information model data;
   receiving real time positional information comprising geographic coordinate information and orientation information;
   rendering a pseudo-realistic image of said loaded 3D scene responsive to said real time positional information;
   displaying said rendered pseudo-realistic image;
   simultaneously displaying engineering information of said building information model data, said displayed engineering information being responsive to said real time positional information;
   receiving a user input associated with a particular positional information;
   saving said user input associated with said particular real time positional information;
   adding an icon representation of said received user input to said rendered pseudo-realistic image; and
   in the event that said received real time positional information corresponds with said saved particular positional information, displaying said received user input.

3. The non-transitory computer-readable medium of claim 2, wherein said icon representation further comprises positional indicators arranged to direct a user so that said received real time positional information corresponds with said saved particular positional information.

4. An electronic device operative to enable field presentation of building information model data, the electronic device comprising:
   a display;
   a real time position determining device arranged to output real time geographic coordinate information and orientation information; and
   a computing platform in communication with said real time position determining device and said display, said computing platform arranged to:
   load a 3D scene comprising building information model data;
   render a pseudo-realistic image of said loaded 3D scene responsive to said outputted real time geographic coordinate information and orientation information;
   output said rendered pseudo-realistic image on said display; and
   output engineering information of said building information model data on said display, said output engineering information responsive to said output real time geographic coordinate information and orientation information,
   wherein said computing platform is arranged to render said photo-realistic image responsive to said outputted real time geographic coordinate information and orientation information, wherein at least one component of said real time geographic coordinate information and orientation information is replaced with data from said 3D scene.

5. An electronic device operative to enable field presentation of building information model data, the electronic device comprising:
   a display;
   a real time position determining device arranged to output real time geographic coordinate information and orientation information; and
   a computing platform in communication with said real time position determining device and said display, said computing platform arranged to:
   load a 3D scene comprising building information model data;
   render a pseudo-realistic image of said loaded 3D scene responsive to said output real time geographic coordinate information and orientation information;
   output said rendered pseudo-realistic image on said display; and
   output engineering information of said building information model data on said display, said output engineering information responsive to said output real time geographic coordinate information and orientation information,
   wherein said display is geographically separated from said computing platform, and wherein said computing platform is further arranged to transmit said rendered pseudo-realistic image to said display.

6. An electronic device operative to enable field presentation of building information model data, the electronic device comprising:
   a display;
   a real time position determining device arranged to output real time geographic coordinate information and orientation information;
   a computing platform in communication with said real time position determining device and said display; and
   a user input device in communication with said computing platform,
   said computing platform arranged to:
   load a 3D scene comprising building information model data;

render a pseudo-realistic image of said loaded 3D scene responsive to said output real time geographic coordinate information and orientation information;

output said rendered pseudo-realistic image on said display;

output engineering information of said building information model data on said display, said output engineering information responsive to said output real time geographic coordinate information and orientation information, receive a user input, via said user input device, associated with a particular geographic coordinate and orientation;

save said received user input associated with said particular geographic coordinate and orientation;

add an icon representation of said received user input to said rendered pseudo-realistic image; and in the event that said output real time geographic coordinate information and orientation information corresponds with said saved particular geographic coordinate and orientation, display said saved received user input.

7. The electronic device according to claim 6, wherein said icon representation further comprises positional indicators arranged to direct a user so that said real time geographic coordinate information and orientation information corresponds with said saved particular geographic coordinate and orientation.

8. A computer implemented method of evaluating a site, the method comprising:

appearing at the site;

loading a 3D scene comprising building information model data associated with the site;

receiving real time positional information comprising geographic coordinate information and orientation information of the site;

automatically rendering a pseudo-realistic image of said loaded 3D scene responsive to said real time positional information, said automatically rendering by a computing device, wherein said computing device is located at a geographically disparate location from the site;

transmitting said rendered pseudo-realistic image to a portable device at the site;

displaying said rendered pseudo-realistic image to a user appearing at said site on a display of the portable device at the site; and simultaneously displaying engineering information of said building information model data to said user appearing at said site on the display of the portable device at the site, said displayed engineering information responsive to said real time positional information.

* * * * *